United States Patent [19]

Ikami et al.

[11] Patent Number: 5,613,192
[45] Date of Patent: Mar. 18, 1997

[54] ONE-WAY DATA TRANSMISSION DEVICE WITH TWO-WAY DATA TRANSMISSION FUNCTION

[75] Inventors: Kazunori Ikami; Yasuhiro Funahashi, both of Nagoya; Yukie Hasegawa, Kasugai, all of Japan

[73] Assignees: Brother Kogyo Kabushiki Kaisha; Xing Inc., both of Aichi, Japan

[21] Appl. No.: 457,594

[22] Filed: Jun. 1, 1995

[30] Foreign Application Priority Data

Jun. 1, 1994 [JP] Japan .................................. 6-120219

[51] Int. Cl.⁶ ..................................................... H04N 7/14
[52] U.S. Cl. ................................ 455/4.2; 455/5.1; 348/7; 348/9; 348/12; 348/13
[58] Field of Search ..................... 348/7, 6, 8, 9, 348/12, 13; 455/3.1, 4.1, 4.2, 5.6, 6.3; H04N 7/10, 7/14, 1/173

[56] References Cited

U.S. PATENT DOCUMENTS

| | | | |
|---|---|---|---|
| 5,245,600 | 9/1993 | Yamauchi et al. | 369/49 |
| 5,357,276 | 10/1994 | Banker et al. | 348/7 |
| 5,365,576 | 11/1994 | Tsumura et al. | 379/93 |
| 5,371,532 | 12/1994 | Gelman et al. | 348/7 |
| 5,408,686 | 4/1995 | Mankovitz | 455/66 |
| 5,410,343 | 4/1995 | Coddington et al. | 348/7 |
| 5,414,455 | 5/1995 | Hooper et al. | 348/7 |
| 5,475,840 | 12/1995 | Nelson et al. | 395/700 |

*Primary Examiner*—John K. Peng
*Assistant Examiner*—Nathan J. Flynn
*Attorney, Agent, or Firm*—Oliff & Berridge

[57] ABSTRACT

When a song data group of a requested song comes in the normal mode ("Yes" in S230,) the terminal 5 picks up that song data D5 in S240. When the song data group of the requested song does not arrive ("No" in S230,) the terminal first judges in S250 whether or not it is necessary to rapidly obtain the song data of the requested song. If the terminal is presently playing a karaoke performance, it is unnecessary to rapidly obtain the song data of the requested song, and therefore the terminal waits for the song data that will come in the normal mode. If the terminal is not conducting a karaoke performance (i.e., "No" in S250), the terminal should be rapidly supplied with the requested song. When it is determined that the requested song will come soon ("Yes" in S290 or S300,) the terminal still waits for the song data that will come in the normal mode. On the other hand, when it is determined that the requested song will not come soon, the terminal transmits request data to the center 3 to request the center 3 to transmit the requested song data to the terminal 5 in the urgent mode.

15 Claims, 8 Drawing Sheets

CHANNEL CA (CENTER → TERMINALS)

| 1 | 2 | 3 | a | 4 | 5 | ....... | L | b | L+1 | ......... | K−1 | K | 1 |
|---|---|---|---|---|---|---------|---|---|-----|-----------|-----|---|---|

CHANNEL CB (TERMINALS → CENTER)

| RE-QUEST DATA a | | RE-QUEST DATA b | |
|---|---|---|---|

ONE-WAY DATA TRANSMISSION DEVICE WITH TWO-WAY DATA TRANSMISSION FUNCTION

BACKGROUND OF THE INVENTION

1. Field of the Invention

The present invention relates to a data transmission device or system wherein a central control unit and a plurality of terminals are connected by a transmission line, the data transmission system being for transmitting information data from the central control unit to the terminals.

2. Description of the Related Art

Conventionally, there is known a data transmission system, wherein a center (central control unit) is connected to a plurality of terminals by a transmission line. The data transmission system is for transmitting information data including various types of information from the center to the terminal according to demands from the terminal side. An advantage of this type of data transmission system is that a memory device for prestoring data information need not be provided to each terminal, so that the terminals have an extremely simple construction.

SUMMARY OF THE INVENTION

A one-way data transmission system is conceivable in which the center serially and cyclically transmits a plurality of information data groups to the terminals. Each terminal monitors the incoming information data groups. When a desired information data group arrives, the terminal picks up the information data group.

Assume now that this one-way transmission system is applied to a karaoke system for supplying karaoke song data to a plurality of terminals. The center repeatedly transmits a plurality of, for example 5,000 songs' worth of song data groups to the terminals, in succession. At a terminal, a user requests a song he or she desires to sing. When a song data group of the requested song arrives, the terminal picks up the song data group and starts the karaoke performance accordingly.

According to this one-way transmission system, when the user requests a song immediately before the song data group for the song arrives, the terminal can pick up that song data group within a very short period of time. However, when the user requests the song immediately after its song data group has been transmitted, the terminal must wait for the next time the song data group arrives after song data groups for all the other songs have been transmitted. In this example, the terminal must wait until song data groups for just under 5,000 songs have been transmitted. This long waiting time is inconvenient for the user.

A two-way transmission system is also conceivable, in which the terminal transmits a request to a center, whereupon the center transmits a requested information data group to the terminal. According to this two-way transmission system, the terminal can obtain the desired information data group within a substantially fixed short period of time.

However, the structure of two-way transmission systems is more complicated and needs more troublesome control processes than the one-way transmission systems. Additional control processes, such as traffic control processes, must be provided to prevent various defects inherent to the two-way transmission, for example, transmission error due to overflow of requests from terminals.

It is therefore an objective of the present invention to overcome the above-described problems and to provide a data transmission system or device wherein a terminal can obtain desired information data within a short waiting time, especially in the case where the terminal desires to rapidly obtain the desired information data.

In order to attain this objective and other objectives, the present invention provides a data transmission device for transmitting information data from a central control unit to a plurality of terminals via a transmission line, the data transmission device comprising: a central control unit; and a plurality of terminals connected to the central control unit via a transmission line, the transmission line having an information data transmission channel, wherein the central control unit includes: information data memory means for storing a plurality of information data; data normal transmission means for successively transmitting the plurality of information data over the information data transmission channel of the transmission line cyclically; request data reception means for receiving request data transmitted from the terminals via the transmission line, the request data designating information data desired to be obtained at the terminals; and data urgent transmission means for transmitting, over the information data transmission channel of the transmission line, information data designated by the request data mixed in the plurality of information data being transmitted successively by the data normal transmission means, wherein each of the plurality of terminals includes: judging means for judging whether or not it is necessary to rapidly obtain the information data that is desired to be obtained at the corresponding terminal; request means for transmitting, to the central control unit, request data designating the desired information data when the judging means judges that it is necessary to rapidly obtain the desired information data; and data pick up means for picking up the desired information data from the information data transmission channel of the transmission line, the data pick up means picking up the desired information data from the plurality of information data transmitted from the data normal transmission means when the request means transmits no request data to the central control unit, the data pick up means picking up the desired information data transmitted from the data urgent transmission means when the request means transmits request data to the central control unit.

According to another aspect, the present invention provides a data transmission method for transmitting information data from a central control unit to a plurality of terminals via a transmission line, the central control unit includes an information data memory for storing a plurality of information data, the transmission line having an information data transmission channel, the data transmission method comprising the steps of: controlling the central control unit to successively transmit the plurality of information data over the information data transmission channel of the transmission line cyclically; controlling a terminal to judge whether or not it is necessary to rapidly obtain an information data that is desired to be obtained at the corresponding terminal; controlling the terminal to transmit, to the central control unit, request data designating the desired information data when it is judged that it is necessary to rapidly obtain the desired information data; controlling the central control unit to receive the request data; controlling the central control unit to transmit, over the information data transmission channel of the transmission line, information data designated by the request data mixed in the plurality of information data being transmitted successively; and controlling the terminal to pick up the desired information data from the information data transmission channel of the transmission line, the data pick up step picking up the desired information data from the plurality of information data being successively transmitted from the central control unit when the terminal has transmitted no request data designating the desired information data to the central control unit, the data pick up step picking up the desired information data transmitted from the central control unit in response to the request data when the terminal has transmitted the request data to the central control unit.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF PREFERRED EMBODIMENT

Figure 1:
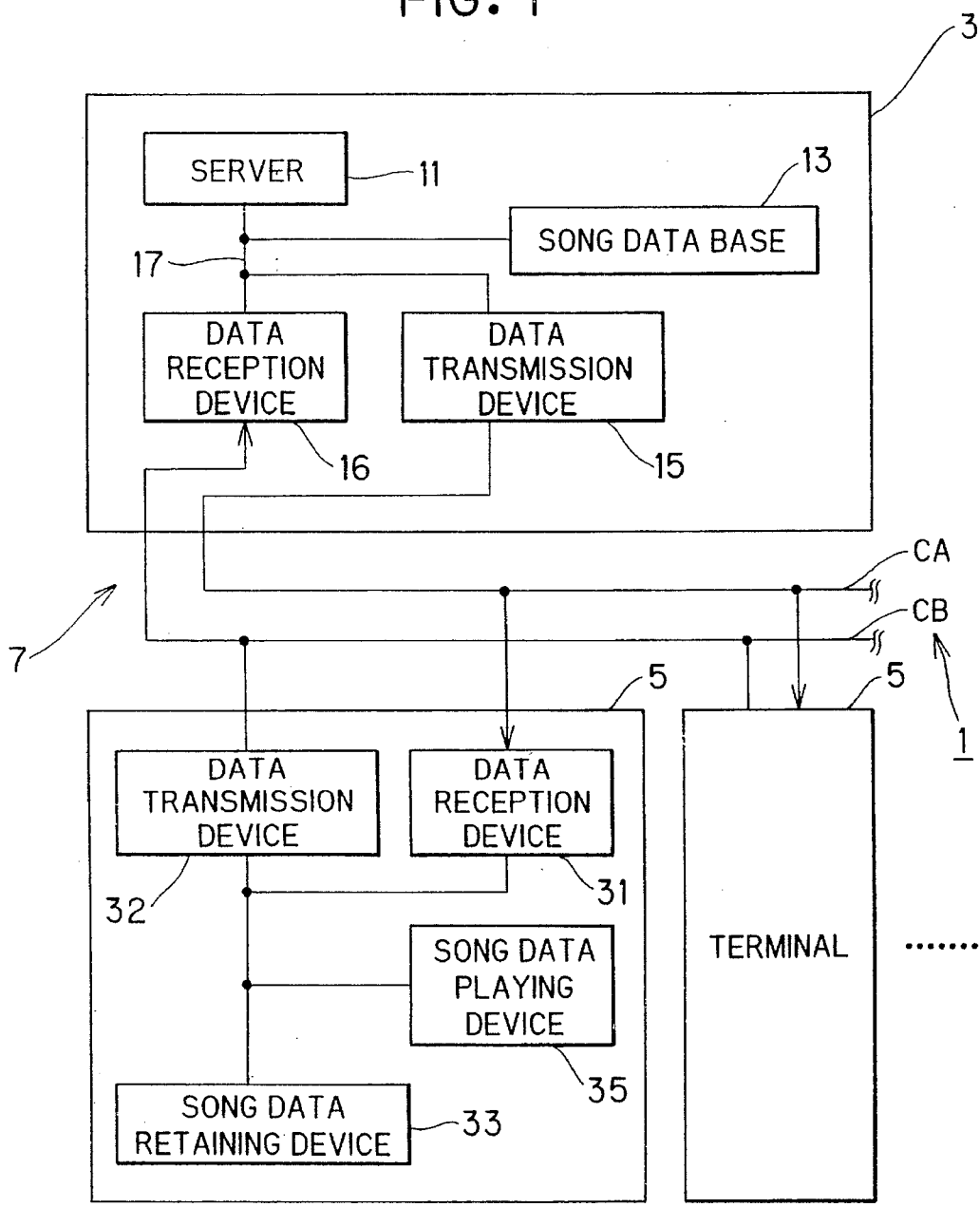
FIG. 1 is a block diagram schematically showing configuration of a data transmission system of a preferred embodiment of the present invention.

A data transmission device or system according to a preferred embodiment of the present invention will be described while referring to the accompanying drawings wherein like parts and components are designated by the same reference numerals as to avoid duplicating description.

The data transmission device of the embodiment is a karaoke system. As shown in FIG. 1, the karaoke system 1 according to the embodiment is constructed from a center 3 connected to a plurality of karaoke terminals 5 by a coaxial cable 7 (transmission line). The karaoke terminals 5 can be provided in separate buildings or in separate establishments or booths within the same building. According to this karaoke system 1, when a user requests at one of the terminals a song he/she desires to sing, a karaoke song data group of the requested song and background image data appropriate for the requested song transmitted from the center are received and reproduced at the terminal. The terminal plays accompaniment music of the requested song while displaying the lyrics of the song and a background image behind the display of the lyrics.

The center 3 includes a server (control portion) 11; a song data base 13; a data transmission device 15; and a data reception device 16. These elements are connected via a bus line 17.

The server 11 is for performing overall control of the center 3. The song data base 13 is constructed from a memory device of a large capacity, such as a hard disk or magnetooptic disks, and stores a plurality of songs' worth of song data groups. For example, song data groups for K-number of songs are stored in the song data base 13. The songs stored in the song base 13 are numbered from b 1to K.

Figure 2:
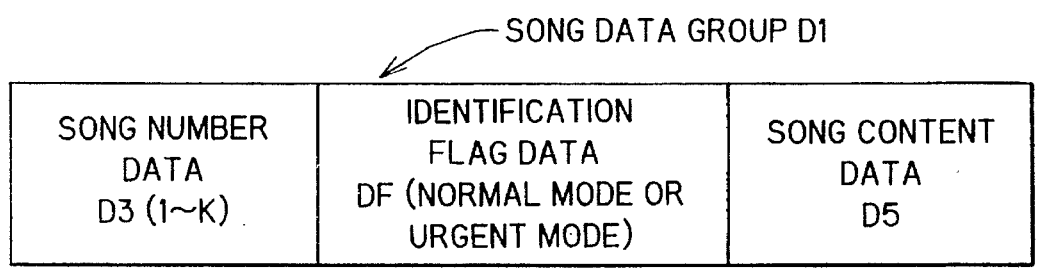
FIG. 2 illustrates configuration of one song's worth of song data group.

As shown in FIG. 2, one song's worth of song data group D1 is constructed from: song number data D3 indicative of the song number; song content data D5; and identification flag data DF indicative of how the corresponding song data group D1 is to be transmitted from the data transmission device 15. The song content data D5 includes: lyric data which will be projected on a monitor television 53 of a karaoke terminal 5 (to be described later); and instrumental accompaniment data which will be played by a sound source 45 of the karaoke terminal 5 (also to be described later.) The accompaniment data is MIDI (Musical Instrument Digital Interface) standard data.

The identification flag data DF indicates that the corresponding song data group D1 is to be transmitted either in a normal mode transmission operation or in an urgent mode transmission operation, which will be described later. When one song data group D1 is retrieved from the song data base 13, the identification flag data DF is set to either one of the two modes of transmission before being transmitted by the data transmission device 15 in a corresponding mode of transmission.

It is noted that song data groups of newly released songs can be inputted to the song data base 13 directly or through a telephone line from a host computer.

The coaxial cable 7 connected between the center 3 and the plurality of terminals 5 has two channels CA and CB. The data transmission device 15 is designed to transmit song data groups over channel CA. The data reception device 16 is designed to receive request data transmitted from terminals 5 over channel CB.

Each of the plurality of karaoke terminals 5 includes a data reception device 31, a data transmission device 32, a song data retaining device 33, and a song data playing device 35. The data reception device 31 is for receiving song data groups transmitted from the center 3 over channel CA. The data transmission device 32 is for transmitting request data to the center 3 over channel CB. The song data retaining device 33 is for temporarily storing song data groups received by the data reception device 31. The song data playing device 35 is for playing karaoke performance based on the song data groups retained in the song data retaining device 33.

Figure 3:
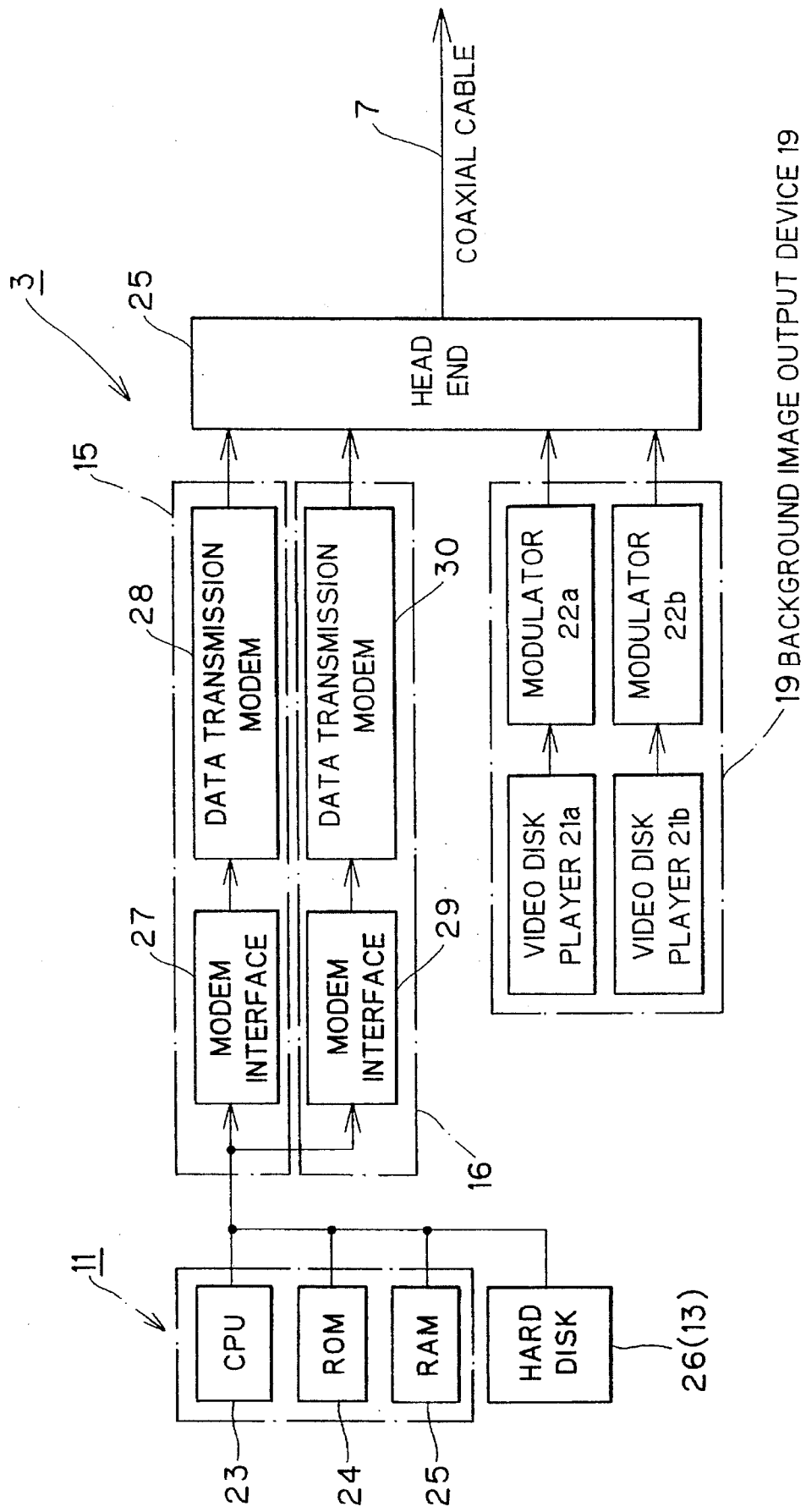
FIG. 3 is a block diagram of configuration of an example of a center of the data transmission system of FIG. 1.

An example of the karaoke system 1 of the present embodiment will be described below with reference to FIGS. 3 through 5. In this concrete example, the coaxial cable 7 includes channels CC and CD, in addition to the two channels CA and CB, for transmitting background images to be displayed on the monitor televisions 53 of the terminals 5 (to be described later).

First, the concrete example of the center 3 will be described while referring to FIG. 3.

According to the example, the server 11 includes a CPU 23, a ROM 24, and a RAM 25. A large-capacity hard disk 26 is provided as the song data base 13. The data transmission device 15 is constructed from a modem interface 27 and a data transmission modem 28. The data reception device 16 is constructed from a modem interface 29 and a data reception modem 30. The center 3 is further provided with a head end 25 and a background image output device 19.

The modem interface 27 is for transferring a song data group retrieved from the hard disk 26 to the data transmission modem 28. The data transmission modem 28 is for modulating the received song data group into radio frequency (RF) alternating current signals of channel (frequency band) CA. The data transmission modem 28 outputs the thus modulated song data group to the head end 25, which in turn transmits the song data group over channel CA.

The data reception modem 30 is for demodulating request signals which have been transmitted from a terminal 5 over channel CB (RF alternating current signals of frequency band CB) and which have been received by the head end 25. The data reception modem 30 demodulates request signals into digital request data. The modem interface 29 is for transferring request data to the CPU 23.

In the background image output device 19, two video disk players 21a and 21b are connected to two modulators 22a and 22b, respectively. The video disk players 21a and 21b are for outputting background image data, that is, video signals according to standard National Television System Committee (NTSC) system for projecting on a monitor television 53 of each karaoke terminal 5 (to be described later). The background image data is categorized according to genre of the karaoke songs requestable at the terminals 5. In this concrete example, one video disk player 21a houses video disks storing image data of images directed toward Japanese ballads, and the other video disk player 21b houses video disks storing image data of images directed toward popular songs. Each of the video disk players 21a and 21b continuously plays the video disks to output background image data. The modulators 22a and 22b modulate background image data from the video disk players 21a and 21b into RF alternating current signals for channels (frequency bands) CC and CD and output them to the head end 25.

The head end 25 includes a variety of devices (not shown) such as a mixer for mixing signals inputted thereto and for outputting the mixed signals to the coaxial cable 7. More specifically, song data groups from the data transmission modem 28, and background image data from the modulators 22a and 22b are inputted to the head end 25. The head end 25 multiplexes the plurality of different channel signals and transmits them over the coaxial cable 7, along which they are transmitted to the karaoke terminals 5.

The head end 25 is also for receiving request signals transmitted from terminals 5 over channel CB and for outputting the request signals to the data reception modem 30.

The CPU 23 is for controlling the entire center 3. According to the present invention, the CPU 23 transmits data in two modes: a normal mode and an urgent mode. In the normal mode of transmission, the CPU 23 retrieves song data groups for all the songs stored in the hard disk 26 in succession and transmits them to the terminals 5. In the urgent mode of transmission, the CPU 23 retrieves from the hard disk 26 a song data group of a song requested by the request data transmitted from a terminal 5 and transmits the song data group toward the terminals 5.

Figure 4:
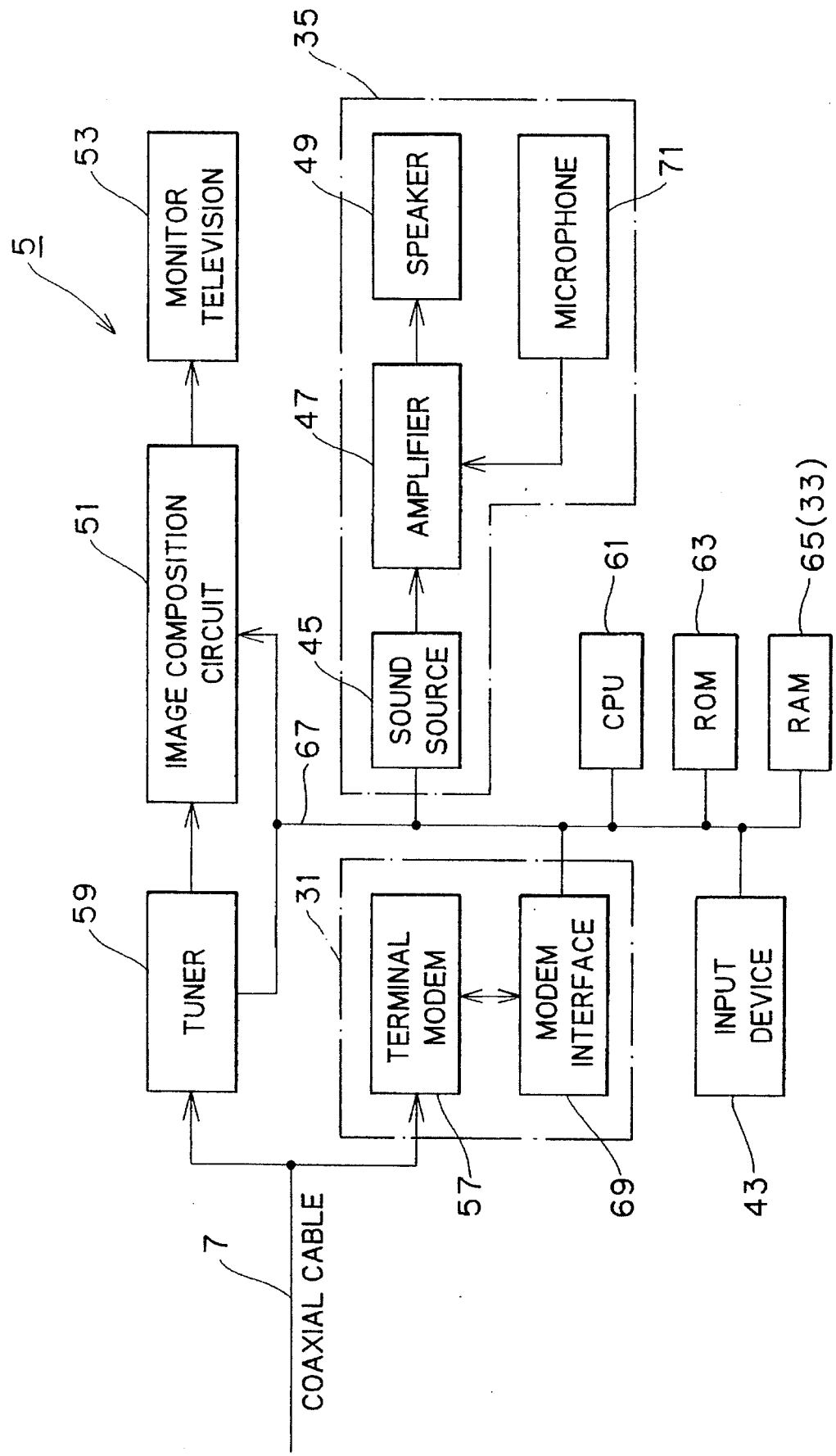
FIG. 4 is a block diagram of configuration of an example of a terminal of the data transmission system of FIG. 1.
Figure 5:
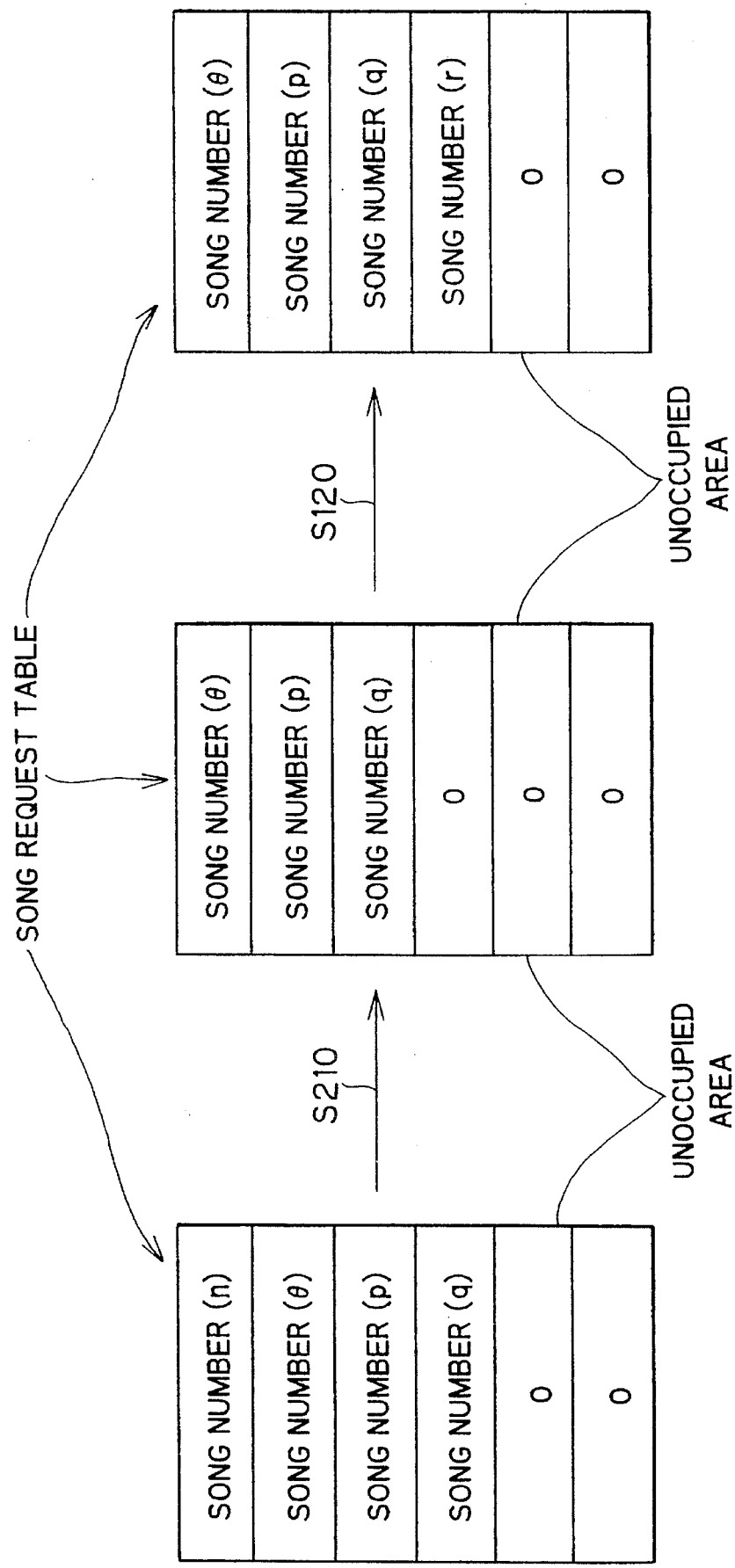
FIG. 5 shows how song numbers are stored in and retrieved from a song request table.

The structure of the example of the karaoke terminal 5 will be provided while referring to FIG. 4.

In the example, a terminal modem 57 and a modem interface 69 are provided for serving as both the data reception device 31 and the data transmission device 32. The song data retaining device 33 is formed from a RAM 65. The song data playing device 35 is constructed from a sound source 45, an amplifier 47, a speaker 49, and a microphone 71. The terminal 5 further includes a CPU 61; a ROM 63; an input device 43; a tuner 59; an image composition circuit 51; and a monitor television 53. A busline 67 is provided for connecting the CPU 61, the ROM 63, the RAM 65, the input device 43, the modem interface 69, the sound source 45, the tuner 59, and the image composition circuit 51.

The input device 43 includes a variety of switches by which a user operates the karaoke terminal 5. The input device 43 includes a number pad (ten key) for inputting a song number of a user's requested karaoke song. The user can request any songs stored in the hard disk 26 of the center 3.

Figures 6A, 6B, 7:
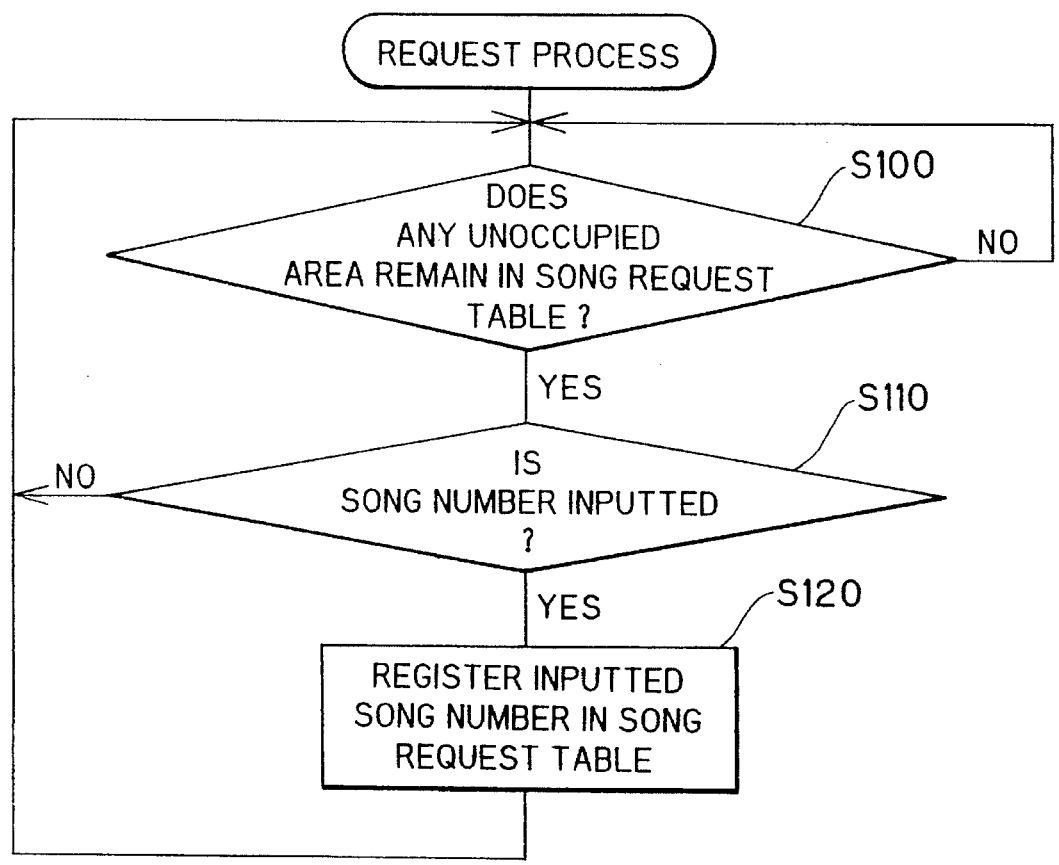
FIG. 6A illustrates song data groups cyclically transmitted from a center to terminals through channel CA in a normal mode with song data groups transmitted in an urgent mode mixed in the song data groups transmitted in the normal mode.
FIG. 6B illustrates how request data is transmitted through channel CB from terminals to the center.
FIG. 7 is a flowchart of a request process of the embodiment.
Figure 8:
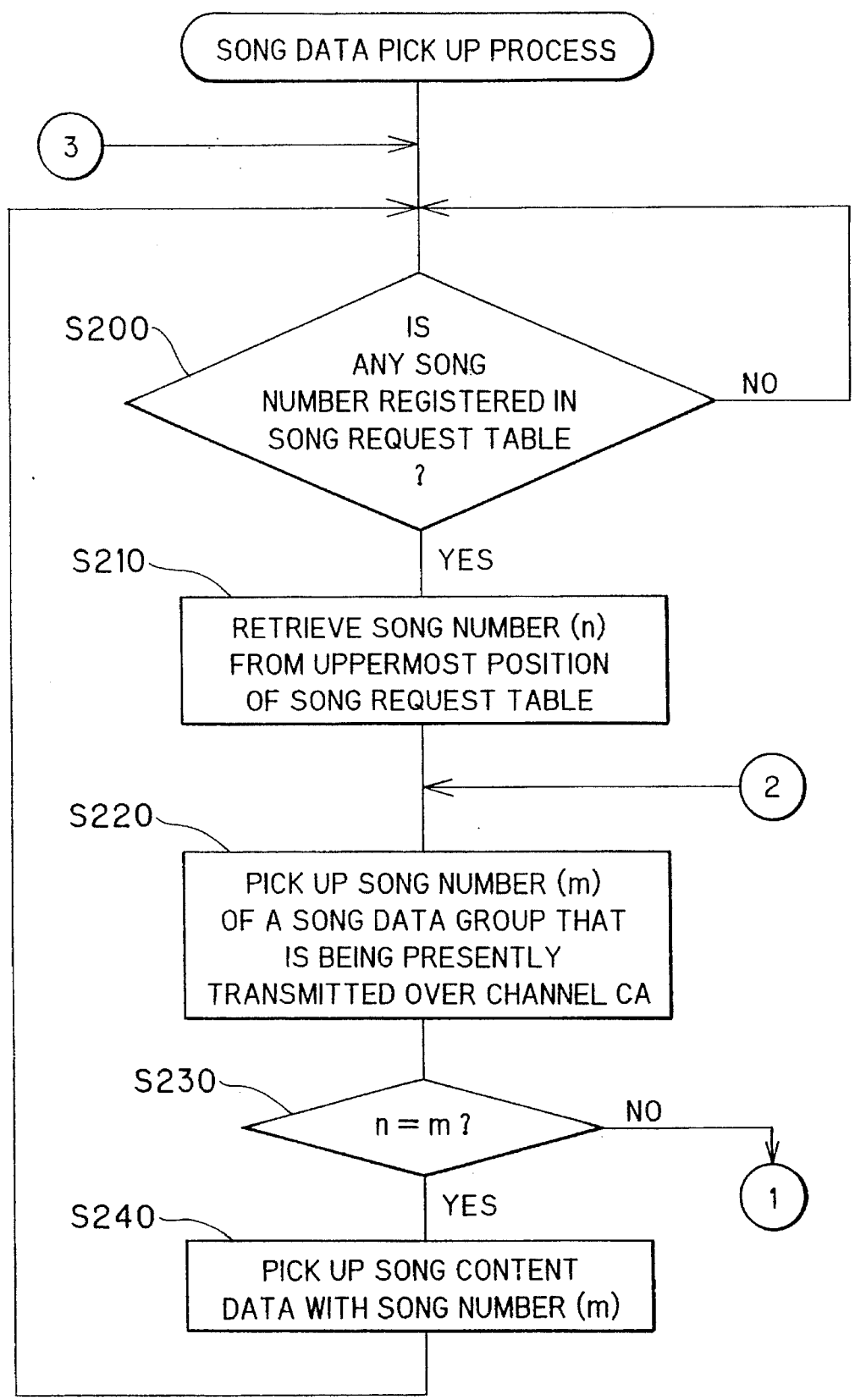
FIG. 8 is a flowchart of a part of a song data pick up process of the embodiment.
Figure 9:
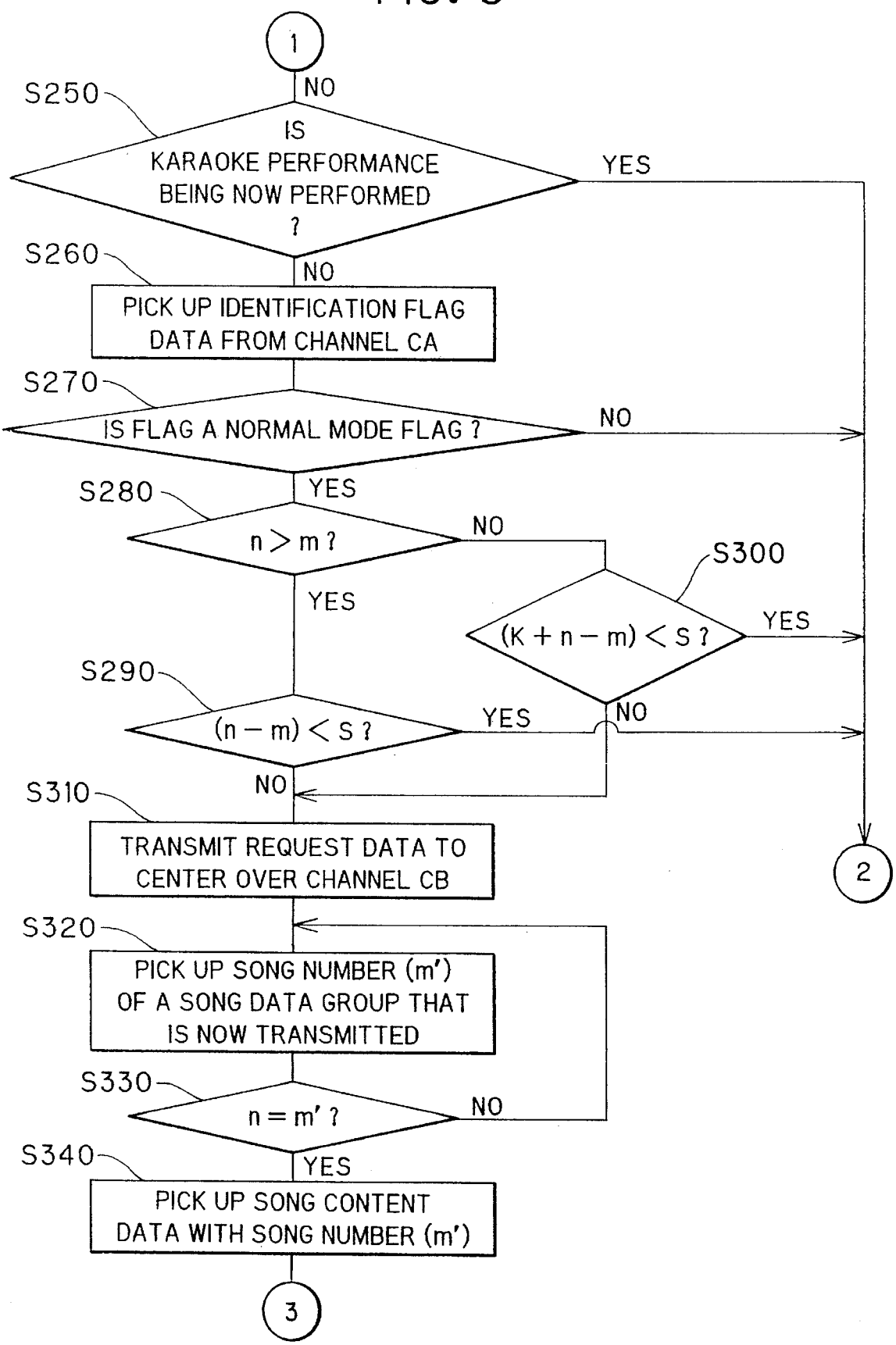
FIG. 9 is a flowchart of a remaining part of the song data pick up process of the embodiment.
Figure 10:
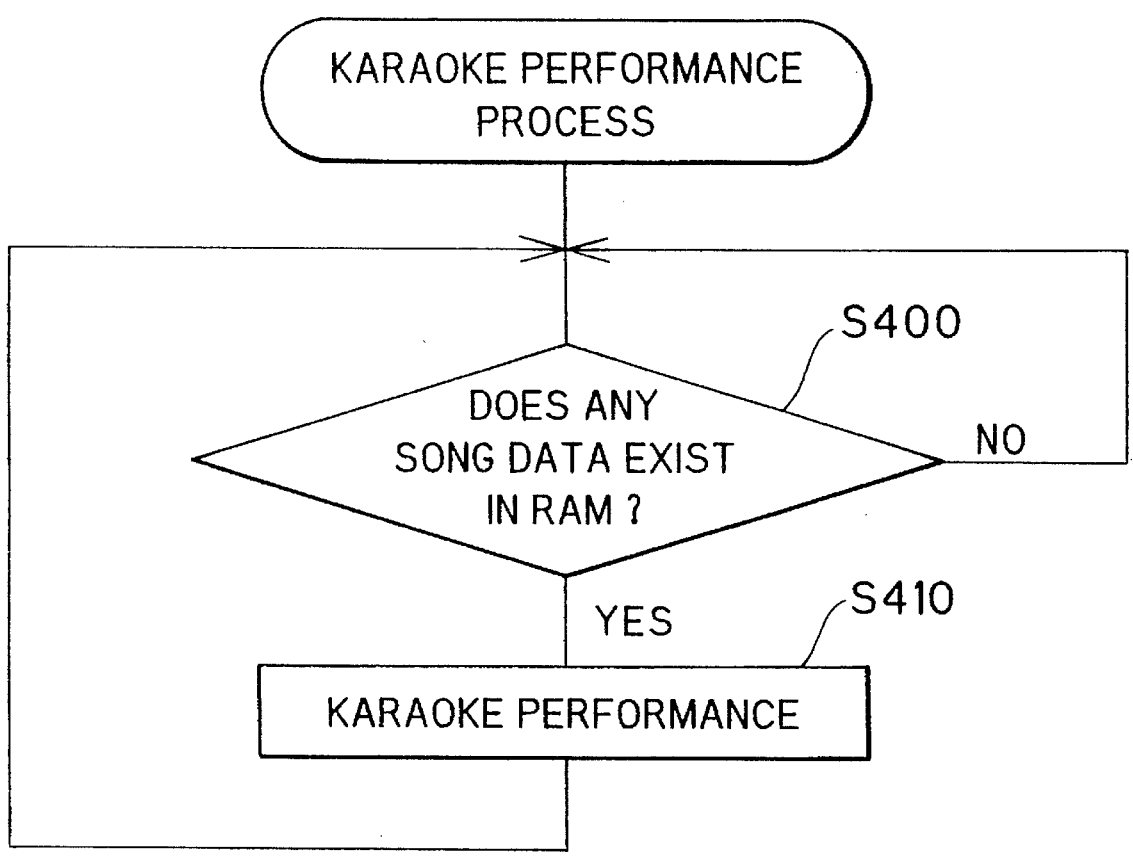
FIG. 10 is a flowchart of a karaoke performance process of the embodiment.

The ROM 63 prestores various programs, including a request process routine of FIG. 7, a song data pick up process routine of FIGS. 8 and 9, and a karaoke performance process routine of FIG. 10. The CPU 61 is for performing overall control of the karaoke terminal 5. The CPU 61 executes the process routines of FIGS. 7–10.

The RAM 65 is for temporarily storing a karaoke song data group of the requested song which has been transmitted from the center 3 over channel CA.

The RAM 65 also previously stores therein song name/ song genre information data indicating what type of song each of a plurality of songs requestable by the input device 43 corresponds to. In this concrete example, the song name/song genre information data indicates the song genre (i.e., Japanese ballads or popular songs) each requestable song corresponds to.

The RAM 65 is further formed with a song request table for storing song numbers of the user's requested songs inputted by the input device 43. The song request table can store six song numbers at maximum. In the request process of FIG. 7 at S120 as will be described later, a song number newly-inputted from the input device 43 is registered in the song request table at the uppermost open position, as viewed in FIG. 5. In the song data pick up process of FIGS. 8 and 9 at S210 also as will be described later, a song number registered in the uppermost position is retrieved from the song request table, whereupon the song data group corresponding to the song number is picked up from channel CA. Song numbers remaining in the table are then shifted one position upward.

The terminal modem 57 is for receiving and demodulating a song data group transmitted from the center 3 over channel CA. The modem interface 69 is for transferring the demodulated song data group to the RAM 65 where the song data group will be temporarily stored.

The modem interface 69 is also for transferring request data, which the CPU 61 produces at S310 of the song data pick up process of FIG. 9 (to be described later), to the terminal modem 57. The terminal modem 57 is for modulating the request data into request signals (i.e., RF alternating current signals of channel CB) and for transmitting The request signals to the center 3 over channel CB.

The video tuner 59 is for receiving the background image signals transmitted from the center 3 over the channels CC and CD. The video tuner 59 is controlled by the CPU 61 to select either one of the channels CC and CD to receive background image signals corresponding to the song genre of the requested karaoke song.

A microphone 71 is provided with each terminal 5 to produce a singing voice signal when a user sings into the microphone 71.

The sound source (synthesizer sound source) 45 is for converting the MIDI data (accompaniment data), included in the song content data D5 of FIG. 2, into a karaoke accompaniment signal.

The amplifier 47 is for receiving both the karaoke accompaniment signal from the sound source 45 and the singing voice signal from the microphone 71. The amplifier 47 mixes the karaoke accompaniment signal and the singing voice signal, amplifies the mixed signal, and outputs it to the speaker 49.

The image composition circuit 51 converts lyric data, also included in the song content data D5, into a lyric image signal, superimposes the lyric image signal onto a background image signal inputted from the video tuner 59, and outputs those superimposed signals to the monitor television 53.

With the above-described structure, the center 3 transmits song data groups, as described below.

According to the present invention, the center 3 transmits song data groups both in the normal mode and in the urgent mode.

In the normal mode, the data transmission device 15 retrieves all the songs, numbered 1 to K, stored in the song data base 13 in succession, and transmits them to the terminals 5 over channel CA. In other words, the data transmission device 15 successively transmits all the songs in the order of the song numbers. After once transmitting all songs, the data transmission device 15 again retrieves and transmits all the songs starting with song number 1. Thus, song data groups for all the songs are cyclically transmitted to the terminals over channel CA with a predetermined time cycle corresponding to the total number K of song data. This normal mode data transmission operation is continually performed, regardless of whether or not users request songs at terminals 5.

In this normal mode operation, after retrieving each song data group D1 from the hard disk 26, the CPU 23 sets the identification flag data DF included in the retrieved song data group D1 into a normal mode flag indicating that the corresponding song data group is to be transmitted in the normal mode operation. The CPU 23 then transfers the retrieved song data group via the modem interface 27 to the data transmission modem 28, where the song data group is modulated into signals of channel CA. The modulated karaoke song data group is then transmitted to karaoke terminals 5 via the head end 25 and over channel CA. Thus, song data groups D1 of all the songs are successively retrieved from the hard disk 26 and transmitted to the terminals 5. When transmission of all the songs is completed, transmission from the first song is repeated. Thus, the songs are repeatedly or cyclically transmitted to the terminals via channel CA.

The center 3 also performs the urgent mode operation upon receiving request data from any terminal 5. In the urgent mode, the data transmission device 15 retrieves, from the song data base 13, a song data group of a song number designated by the request data. The data transmission device 15 transmits the song data group to terminals 5 over channel CA together with the song data groups successively transmitted in the normal mode operation.

In order to perform this urgent mode operation, when receiving request data from any terminal 5, the CPU 23 retrieves from the hard disk 26 a song data group of a song number designated in the request data. The CPU 23 sets the identification flag data DF in the retrieved song data group D1 to an urgent mode flag indicating that the corresponding song data group is to be transmitted in the urgent mode operation. The CPU 23 then transfers the retrieved song data group via the modem interface 27 to the data transmission modem 28, where the song data group is modulated into a signal of channel CA and transmitted to terminals 5 via the head end 25 and over channel CA.

Now assume that request data for requesting songs numbered $\underline{a}$ and $\underline{b}$ (where $\underline{a}$ and $\underline{b}$ are in the range of 1 to K) are transmitted from a terminal 5 over channel CB at timings shown in FIG. 6B. Upon receiving the request data, the data transmission device 15 will transmit song data groups of song numbers $\underline{a}$ and $\underline{b}$ over channel CA. As shown in FIG. 6A, the song data groups of song numbers $\underline{a}$ and $\underline{b}$ will be transmitted mixed with other song data groups 1 to K being cyclically transmitted in the normal mode. In this example, the song data group of song number $\underline{a}$ is transmitted between song data groups of song numbers 3 and 4. The song data group of song number $\underline{b}$ is transmitted between song data groups of song number L (where 1<L<K) and song number (L+1). Although the song data groups of all the songs numbered 1 to K are transmitted with their identification flag data DF being set to the normal mode, the song data groups of song numbers $\underline{a}$ and $\underline{b}$ are transmitted with their identification flag data DF being set to the urgent mode.

At each terminal 5, a user requests songs he or she desires to sing. When a song data group for a requested song is transmitted from the center 3 and arrives at the terminal 5, the terminal 5 picks up that song data from channel CA and starts the karaoke performance. The sequence of operations is constructed from the request process of FIG. 7, the song data pick up process of FIGS. 8 and 9, and the karaoke performance process of FIG. 10, which are all being continuously executed by the CPU 61 whenever power of the terminal 5 is ON.

The request process will be first described below, with reference to FIG. 7.

In the request process, the CPU 61 first judges whether any unoccupied area remains in the song request table in the RAM 65, in step (referred to as simply "S" hereinafter) 100. When unoccupied area remains in the song request table, the program proceeds to S110, where the CPU 61 judges whether or not a song number has been inputted to the input device 43. When a song number has been inputted (i.e., "Yes" in S110), the inputted song number is registered in S120 at the uppermost open location of the song request table. The program then returns to S100. On the other hand, if no song number has been input ted to the input device 43 (i.e., "No" in S110), the program returns to S100, whereupon S100 and S110 are repeated.

The song data pick up process will be described below with reference to FIGS. 8 and 9. The song data pick up process is characteristic to the present invention.

As shown in FIG. 8, the CPU 61 first judges, in S200, whether or not any song number is registered in the song request table. If a song number is registered in the table (i.e., Yes in S200), the song number (n, for example) registered in the uppermost position of the table is retrieved therefrom, in S210.

Then, in S220, the song number data D3 is picked up from a song data group D1 that is presently being transmitted to the terminal over channel CA. (The song number of that song data will be referred to as a presently-transmitted song number (m) hereinafter.) S230 then judges whether the picked up song number (m) equals the requested song number (n). If a song data group for the requested song just arrives at the terminal, then (m) will equal (n) (i.e., "Yes" in S230) so that the program proceeds to S240. In S240, the terminal 5 picks up the song content data D5 of the requested song number (n) from the coaxial cable 7. That is, the song content data D5 is picked up at the terminal modem 57 and is transferred via the modem interface 69 into the RAM 65 where the song content data will be temporarily stored.

On the other hand, if (m) does not equal (n) (i.e., "No" in S230), the program proceeds to S250. In S250, the CPU 61 judges whether or not the song data playing device 35 is presently playing a karaoke performance. That is, the CPU 61 judges whether or not the sound source 45 is being controlled to play a karaoke song at S410 of the karaoke performance process of FIG. 10 as will be described later. If the sound source 45 is playing a karaoke song (i.e., "Yes" in S250), it can be concluded that the terminal does not need to rapidly obtain a song data group of the requested song (n). Accordingly, the program returns to S220 to again try to pick up song number data D5 of a song data group D1 that next arrives at the terminal.

On the other hand, if the sound source 45 is not playing a karaoke song (i.e., "No" in S250), it is necessary to rapidly obtain song data of the requested song so that the lively atmosphere is not dispelled by a long wait for the next song. The program therefore proceeds to S260 where the identification flag data DF of the presently arriving song data group is picked up from the coaxial cable 7. Then, S270 judges whether or not the identification flag data DF is set to either the normal mode or the urgent mode. If the identification flag data DF is set to the urgent mode (i.e., "No" in S270), the program returns to S220 to again try to pick up song number data of a song data group that will be next arriving at the terminal.

On the other hand, if the identification flag data DF is set to the normal mode (i.e., "Yes" in S270), the program proceeds to S280 to judge whether the requested song number (n) is higher than the presently-transmitted song number (m). If (n) is greater than (m) (i.e., "Yes" in S280,) it can be judged that the song data group with song number (n) will arrive after (n−m)-numbered song data groups are transmitted. S290 judges whether or not the value of (n−m) is smaller than a predetermined threshold value S. If (n−m) is less than S (i.e., "Yes" in S290,) it is determined that the song data group of the requested song (song number n) will arrive soon. In other Words, the song data group with song number (n) will come after (S-1) or less numbered song data groups are transmitted. The program therefore returns to S220 to wait for the requested song data with song number (n).

On the other hand, if (n)<(m) (i.e., "No" in S280,) it can be judged that the song data with song number (n) will come after (K+n−m)-numbered song data groups. Accordingly, S300 further judges whether or not the value of (K+n−m) is smaller than the predetermined threshold value S. If (K+n−m)<S (i.e., "Yes" in S300,) it is determined that the song data group of the requested song (song number n) will arrive soon. In other words, the song data group with song number (n) will come after (S-1) or less numbered song data groups. The program therefore returns to S220 to wait for the requested song data with song number (n).

On the other hand, if a negative judgement is performed in either S290 or S300, it is determined that the song data group of the requested song will not come soon. That is, the song data group will come after S or more numbered song data groups come. Accordingly, the program proceeds to S310 where the CPU 61 produces request data indicating the requested song number (n). The CPU 61 transfers the request data via the modem interface 31 to the terminal modem 57. The terminal modem 57 modulates the request data into a request signal and transmits the request signal over channel CB to the center 3. Upon receiving the request signal, the center 3 will perform urgent mode operations to transmit a song data group for the requested song number (n) to the terminals 5.

Then, the program proceeds to S320 to again try to pick up song number data D3 (referred to as song number (m')) of a song data group presently being transmitted to the terminal. Then, S330 judges whether or not the song number (m') equals to the requested song number (n). When the song data group of the requested song number (n), that is transmitted from the center 3 in the urgent mode, arrives at the terminal, (m') becomes equal to (n) (i.e., "Yes" in S330). Accordingly, in S340, the song content data D5 of that song data group is picked up from the coaxial cable 7 and stored into the RAM 65. On the other hand, during the song data group of the requested'song number (n) has not yet come, the picked up song number (m') does not equal the requested song number (n), and therefore the program returns to S320 to repeatedly perform S320 and S330 until the packed up number (m') equals the requested song number (n).

As described above, according to the karaoke system 1 of the present embodiment, when a song data group of a requested song comes in the normal mode ("Yes" in S230,) the terminal 5 picks up that song data D5 in S240. When the song data group of the requested song does not arrive ("No" in S230,) the terminal first judges in S250 whether or not it is necessary to rapidly obtain the song data of the requested song. That is, the terminal judges whether or not the terminal is presently playing a karaoke performance for another song. If the terminal is presently playing a karaoke performance, it is unnecessary to rapidly obtain the song data of the requested song, and therefore the terminal waits for the song data that will come in the normal mode. In the normal mode operation, the K-numbered song data groups including the requested song data are transmitted in succession. A period of time required until the requested song will come depends on the timing at which S220 of the song data pick up process of FIGS. 8 and 9 is performed. The requested song data will either come soon, or otherwise come after a long period of time has passed. The requested song may come after all the other songs ((K-1)-numbered songs) come. This long waiting time, however, provides no adverse effects to the user, because the terminal is now involved in playing karaoke performance for another song which the user is enjoying.

On the other hand, when the terminal is not conducting a karaoke performance (i.e., "No" in S250), the terminal should be rapidly supplied with the requested song. When it is determined that the requested song will come soon ("Yes" in S290 or S300,) the terminal still waits for the song data that will come in the normal mode. However, when it is determined that the requested song will not come soon, the terminal transmits request data to the center 3 to request the center 3 to transmit the requested song data to the terminal 5 in the urgent mode.

It is noted that according to the urgent mode operation, a substantially fixed time period P is required from when the terminal 5 sends request data to the center 3 until widen the terminal receives requested song data. In the present embodiment, this time period P is almost equal to a time period required for transmitting S-number of song data in the normal mode. Accordingly, in S290 and S300, the difference between the requested song number (n) and the now transmitted song number (m) is compared with the number S. If the difference is shorter than the threshold value S (i.e., "Yes" in S290 or S300), it can be assumed that the requested song will come in the normal mode sooner than in the urgent mode. Accordingly, the terminal waits for the requested song data to be transmitted in the normal mode. On the other hand, if the difference is equal to or higher than the threshold value S (i.e., "No" in S290 and S300,) it can be assumed that the terminal can obtain the requested song using the urgent mode sooner than in the normal mode. Accordingly, the terminal transmits request data to the center and waits for the requested song data transmitted in the urgent mode.

It is noted that song data groups with song numbers 1 to K are transmitted over channel CA in succession in the normal mode while, as shown in FIG. 6A, song data with song numbers $\underline{a}$ and $\underline{b}$, for example, are transmitted in the urgent mode mixed in the song data groups transmitted in the normal mode. Therefore, in order to determine whether the requested song data will come sooner when transmitted in the normal mode, the song number ("a" or "b") of song data transmitted in the urgent mode should not be used for calculating the difference from the requested song number (n). Accordingly, S270 refers to the identification flag data DF of the presently-transmitted song data. If the presently-transmitted song data is being transmitted in the normal mode, the program proceeds to calculate the difference between the presently-transmitted song number and the requested song number, thereby determining whether the requested song will come soon in the normal mode. On the other hand, if the presently-transmitted song data is one transmitted in the urgent mode, the program does not calculate the difference but returns to S220 to again try to pick up song data that will come next.

Now assume that song data with song number 50 is transmitted in the urgent mode between the song data with song numbers 2 and 3, which are transmitted in the normal mode. This results in song data groups for song numbers 1, 2, 50, 3, 4, and so on being transmitted in this order. When the song data group with song number 50 arrives at the terminal and is picked up at S220, the song number 50 should not be used for the calculation of S290 or S300 as the basis for determining how much time will be required until the requested song arrives. The program therefore returns to S220, and a song data group with song number 3 that arrives next to the song data group with song number 50 is picked up and used as the basis for determining the time period.

Then, if it is determined that the requested song data will come in the normal mode soon, i.e., within the time period P, the terminal 5 does not transmit request data to the center 3 but simply waits for the requested song data to be transmitted in the normal mode. On the other hand, if the requested song data will not come in the normal mode within the time period P, the terminal 5 transmits request data to the center 3 and waits for the requested song data to be transmitted in the urgent mode.

The karaoke performance process will be described below with reference to FIG. 10.

As shown in FIG. 10, the CPU 61 first judges whether or not any song data D5 picked up by the song data pick up process is stored in the RAM 65, in S400. If a song data is stored in the RAM 65, the CPU 61 retrieves the song data from the RAM 65, based on which a karaoke performance is started in S410. After the performance ends, the program returns to S400.

In the karaoke performance process, the CPU 61 supplies the image composition circuit 51 with the lyric data included in the song data retrieved from the RAM 65. The CPU 61 supplies the sound source 45 with the MIDI data also included in the song data.

The CPU 61 refers to the song name/song genre information data stored in the RAM 65 so as to determine the song genre of the requested song with the song number (n). Then, the CPU 61 controls the video tuner 59 to switch to the channel over which a background image signal corresponding to the genre of the requested song is being transmitted. The background image signal received by the video tuner 59 is supplied into the image composition circuit 51.

The image composition circuit 51 converts the received lyric data into a lyric/image signal, and superimposes the lyric/image signal onto the background image signal. Receiving those superimposed signals, the monitor television 53 displays characters of the lyrics superimposed on the background image.

The sound source 45 converts the received MIDI data into an accompaniment signal, and inputs the signal to the amplifier 47. The amplifier 47 mixes the accompaniment signal with the voice signal from the microphone 71 as sung by a user, amplifies those signals appropriately, and outputs them to the speaker 49.

As described above, though the basic structure of the data transmission system of the present embodiment is a one-way data transmission system, the data transmission system of the present invention can supply desired data to terminals within a short period of time when the terminals desire to rapidly obtain that data.

While the invention has been described in detail with reference to the specific embodiment thereof, it would be apparent to those skilled in the art that various changes and modifications may be made therein without departing from the spirit of the invention, the scope of which is defined by the attached claims.

For example, in the above-described embodiment, the channel CA of the coaxial cable 7 is for transmitting song data to the terminals, while the channel CB being for transmitting request data to the center. However, the request data can be transmitted from the terminals to the center via a device other than the coaxial cable 7. For example, the request data can be transmitted via a telephone line or a Local Area Network (LAN) line.

The present invention is not limited to application to a karaoke system but can also be applied to data transmission systems for providing various types of information such as weather reports and traffic information. Various methods can be provided to divide information to a plurality of information data groups for being transmitted cyclically to the terminals. For example, weather informations for plural local regions can be divided into the plural information data groups.

What is claimed is:

1. A data transmission device for transmitting information data from a central control unit to a plurality of terminals via a transmission line, the data transmission device comprising:

a central control unit; and a plurality of terminals connected to the central control unit via a transmission line, the transmission line having an information data transmission channel, wherein the central control unit includes:

information data memory means for storing a plurality of information data;

data normal transmission means for successively transmitting the plurality of information data in a predetermined order over the information data transmission channel of the transmission line cyclically;

request data reception means for receiving request data transmitted from the terminals via the transmission line, the request data designating information data desired to be obtained at the terminals; and data urgent transmission means for inserting the designated information data between two successive information data of the plurality of information data which are being transmitted successively by the data normal transmission means so that the designated information data are transmitted over the information data transmission channel of the transmission line while being mixed in the plurality of information data, wherein each of the plurality of terminals includes:

judging means for judging whether or not it is necessary to rapidly obtain the information data that is desired to be obtained at the corresponding terminal;

request means for transmitting, to the central control unit, request data designating the desired information data when the judging means judges that it is necessary to rapidly obtain the desired information data; and data pick up means for picking up the desired information data transmission channel of the transmission line, the data pick up means picking up the desired information data from the plurality of information data transmitted from the data normal transmission means when the request means transmits no request data to the central control unit, the data pick up means picking up the desired information data transmitted from the data urgent transmission means when the request means transmits request data to the central control unit.

2. A data transmission device of claim 1, wherein the transmission line further includes a request data transmission channel, the request means transmitting the request data to the central control unit over the request data transmission channel.

3. A data transmission device of claim 1, wherein plurality of information data stored in the information data memory means are added with consecutive data numbers, the data normal transmission means successively transmitting the plurality of information data in an order of the corresponding data numbers, wherein the data urgent transmission means places the desired information data designated by the request data between successive two information data of the plurality of information data being transmitted by the data normal transmission means, and wherein each of the terminals further includes data monitor means for monitoring the data numbers of the information data transmitted over the data transmission channel, the data pick up means picking up the desired information data based on the monitored results.

4. A data transmission device of claim 3, wherein each of the plurality of information data stored in the information data memory means is further added with an indication flag indicative of whether the corresponding information data is transmitted from either the data normal transmission means or the data urgent transmission means, wherein the data normal transmission means sets the indication flags of the plurality of information data to indicate that the plurality of information data are transmitted successively in the order of the data numbers, before transmitting the plurality of information data to the terminals, and wherein the data urgent transmission means sets the indication flag of the desired information data to indicate that the desired information data is transmitted in response to the request data, before transmitting the desired information data to the terminals, and wherein the data monitor means monitors both the data numbers and the indication flags of the information data transmitted over the data transmission channel, the data pick up means picking up the desired information data based on the monitored results.

5. A data transmission device of claim 1, wherein each of the terminals further includes:

data confirming means for confirming information data that is being presently transmitted over the data transmission channel;

time determination means for determining a time period required until the desired information data will be transmitted over the data transmission channel by the data normal transmission means; and comparison means for comparing the determined time period with a predetermined value, the request means transmitting the request data to the central control unit when the determined time period is longer than the predetermined value where it is judged necessary to rapidly obtain the desired information data.

6. A data transmission device of claim 5, wherein the predetermined value indicates a time period required from the request means transmits request data to the central control unit until the desired information data will be transmitted to the terminal from the central control unit by the data urgent transmission means.

7. A data transmission device of claim 6, wherein the plurality of information data stored in the information data memory means are numbered with consecutive data numbers, the data normal transmission means transmitting the plurality of information data in succession in the order of the data numbers, the data confirming means confirming the data number of information data that is being presently transmitted over the data transmission channel, and wherein the time determination means includes calculation means for calculating the difference between the data number of the desired information data and the data number confirmed by the data confirming means.

8. A data transmission device of claim 7, wherein the plurality of information data stored in the information data memory means are added with transmission kind data, wherein the data normal transmission means sets transmission kind data, added to the plurality of information data to be transmitted by the data normal transmission means, to indicate that the plurality of information data are transmitted successively in the order of the data numbers, and wherein the data urgent transmission means sets transmission kind data, added to the desired information data to be transmitted by the data urgent transmission means, to indicate that the desired information data is transmitted while being mixed in the successively-transmitted plurality of information data.

9. A data transmission device of claim 8, wherein the data confirming means includes:

transmission kind data pick up means for picking up transmission kind data of information data that is being presently transmitted over the data transmission channel;

transmission kind data confirming means for judging the transmission kind data of the presently-transmitted information data;

repetition control means for controlling the transmission kind data pick up means and the transmission kind data confirming means to repeatedly pick up the transmission kind data of information data successively transmitted over the data transmission channel and to repeatedly judge the picked up transmission kind data until the picked up transmission kind data indicates that the corresponding information data is one of the successively-transmitted plurality of information data; and data number pick up means for picking up data number added to the information data with its transmission kind data having been judged to indicate that the corresponding information data is one of the successively-transmitted plurality of information data, and wherein the calculation means calculates the difference between the data number of the desired information data and the data number confirmed by the data confirming means.

10. A data transmission device of claim 1, wherein each of the plurality of terminals further includes:

input means for designating an information data desired to be obtained;

data temporary storing means for temporarily storing information data which has been picked up by the data pick up means; and data processing means for processing the information data stored in the data temporary storing means so as to output information, and wherein the judging means judges whether or not the data processing means is presently processing information data, the judging means judging that it is unnecessary to rapidly obtain the desired information data designated by the input means when the data processing means is presently processing the information data.

11. A data transmission device of claim 10, wherein the plurality of information data stored in the information data memory means include a plurality of songs' worth of song data, each song data including accompaniment music data and lyric data of a corresponding song and added with a song number designating the corresponding song, wherein the input means designates a song number of a song desired to be sung, and wherein the data processing means includes a sound source for processing the accompaniment music data to play accompaniment music of the desired song and a display for processing the lyric data to display lyric images of the desired song, thereby achieving karaoke performance.

12. A data transmission method for transmitting information data from a central control unit to a plurality of terminals via a transmission line, the central control unit including an information data memory for storing a plurality of information data, the transmission line having an information data transmission channel, the data transmission method comprising the steps of:

controlling the central control unit to successively transmit the plurality of information data in a predetermined order over the information data transmission channel of the transmission line cyclically;

controlling a terminal to judge whether or not it is necessary to rapidly obtain an information data that is desired to be obtained at the corresponding terminal;

controlling the terminal to transmit, to the central control unit, request data designating the desired information data when it is judged that it is necessary to rapidly obtain the desired information data;

controlling the central control unit to receive the request data;

controlling the central control unit to insert the designated information data between two successive information data among the plurality of information data which are being transmitted successively so that the designated information data are transmitted over the information data transmission channel of the transmission line while being mixed in the plurality of information data; and controlling the terminal to pick up the desired information data from the information data transmission channel of the transmission line, the data pick up step picking up the desired information data from the plurality of information data being successively transmitted from the central control unit when the terminal has transmitted no request data designating the desired information data to the central control unit, the data pick up step picking up the desired information data transmitted from the central control unit in response to the request data when the terminal has transmitted the request data to the central control unit.

13. A data transmission method of claim 12, wherein the transmission line further includes a request data transmission channel, the terminal transmitting the request data to the central control unit over the request data transmission channel.

14. A data transmission method of claim 12, wherein the plurality of information data stored in the information data memory are added with consecutive data numbers, wherein the central control unit is controlled to successively transmit the plurality of information data in an order of the corresponding data numbers, wherein the central control unit is controlled to place the desired information data designated by the request data between successive two information data of the plurality of information data being successively transmitted, and wherein each of the terminals monitors the data numbers of the information data transmitted over the data transmission channel, thereby picking up the desired information data based on the monitored results.

15. A data transmission method of claim 14, wherein each of the plurality of information data stored in the information data memory is further added with an indication flag indicative of whether the corresponding information data is transmitted as one of the successively-transmitted plural information data or is transmitted in response to the request data, wherein the central control unit is controlled to set the indication flag of each of the plurality of information data to indicate that the corresponding information data is transmitted as one of the successively-transmitted plural information data, before transmitting the corresponding information data as one of the successively-transmitted plural information data, wherein the central control unit is controlled to set the indication flag of the desired information data to indicate that the desired information data is transmitted in response to the request data, before transmitting the desired information data, and wherein the terminal is controlled to monitor both the data numbers and the indication flags of the information data transmitted over the data transmission channel, thereby picking up the desired information data based on the monitored results.

* * * * *